F. THOMPSON.
APPARATUS FOR THE MANUFACTURE OF TAR MACADAM AND THE LIKE.
APPLICATION FILED JUNE 17, 1911.
1,052,628.
Patented Feb. 11, 1913.
2 SHEETS—SHEET 1.
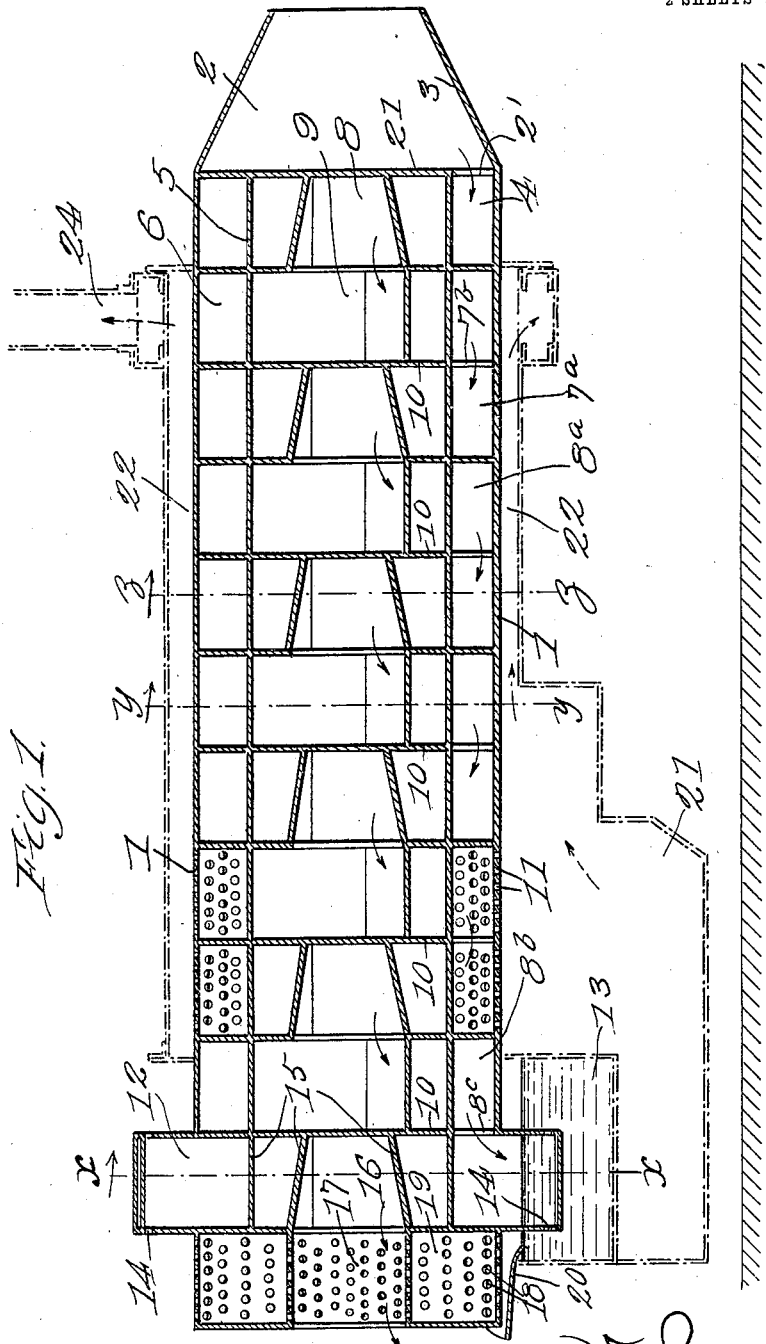

F. THOMPSON.
APPARATUS FOR THE MANUFACTURE OF TAR MACADAM AND THE LIKE.
APPLICATION FILED JUNE 17, 1911.
1,052,628.
Patented Feb. 11, 1913.
2 SHEETS—SHEET 2.
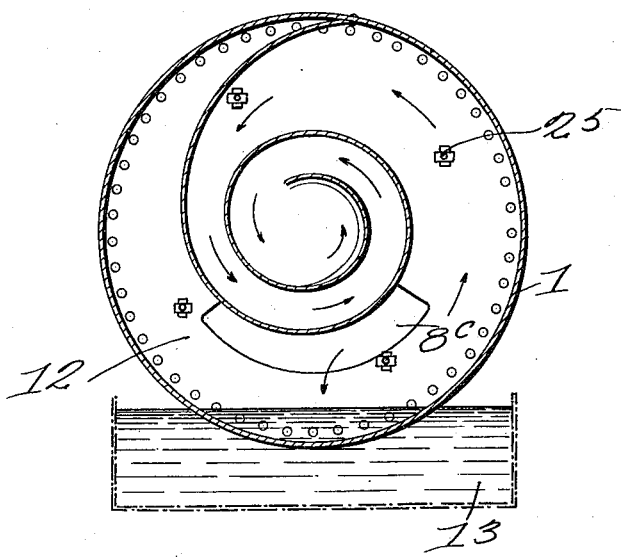
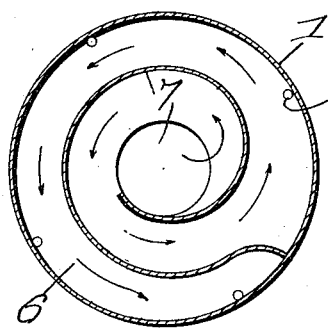
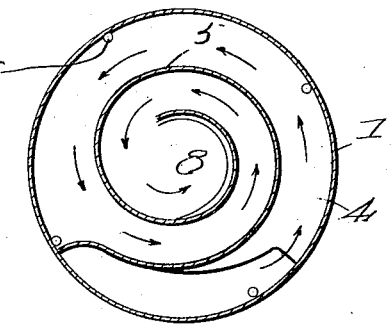

UNITED STATES PATENT OFFICE.

FREDERICK THOMPSON, OF TAMWORTH, ENGLAND.

APPARATUS FOR THE MANUFACTURE OF TAR-MACADAM AND THE LIKE.

1,052,628.

Specification of Letters Patent.  Patented Feb. 11, 1913.

Application filed June 17, 1911. Serial No. 633,827.

*To all whom it may concern:*

Be it known that I, FREDERICK THOMPSON, a subject of the Kingdom of Great Britain, residing at "Langland," Ashby Road, Tamworth, in the county of Stafford, England, engineer, have invented certain new and useful Improvements in or Pertaining to Apparatus for the Manufacture of Tar-Macadam and the Like, of which the following is a specification.

This invention comprises certain improvements in or relating to machines or apparatus for the manufacture of tar macadam and other such like material, and it has for its purpose to provide a particularly compact and efficient form of apparatus which is simple in construction, satisfactory and efficient in operation and cheap to manufacture.

The present invention includes a particularly satisfactory form of mixing chamber in which the stones and the like are treated with the impregnant such as tar or the like, the said form of chamber consisting advantageously of a spiral or the like whereby the material under treatment is traversed in a radial direction by way of a path of considerable length thereby thoroughly admixing the two materials in a very efficient and economical manner.

Referring to the drawings:—Figure 1 is a vertical sectional view of an apparatus embodying the invention. Fig. 2 is a cross sectional view on line x—x of Fig. 1. Fig. 3 is a sectional view on line y—y of Fig. 1. Fig. 4 is a sectional view on line z—z of Fig. 1.

In Figs. 1 and 2 a tube or hollow cylinder 1 is adapted to rotate on rollers which bear against the outer periphery of the tube, a worm and wheel or other suitable means being provided to effect the desired rotation of the cylinder. Said cylinder is provided with means whereby the stones and material are effectually dried and after the drying process has been completed the material gravitates to an enlarged part of the tube in order that it may be impregnated with tar or other impregnant; the treated material is then passed on into a draining chamber and finally delivered from the extremity of the apparatus remote from that at which it entered.

At the feeding extremity of the drying cylinder a mouthpiece 2 is secured of truncated conical shape. The interior of the mouthpiece forms a scoop portion 3 adapted to take up and deliver the material through a lateral opening 2' in the plate 21 into the chamber 4 pertaining to the first scroll or conveyer 5 of spiral conformation, whereby the material at the periphery of the drying cylinder is picked up and gradually fed toward the center of such cylinder. Adjacent to the chamber 4 and scroll 5 are another chamber 6 and scroll 7 but the latter scroll is of a direction of curvature opposite to that of the first scroll 5. Thus it will be readily understood that material passed from the central chamber 8 pertaining to the first scroll 5 into the chamber 9 pertaining to the second scroll 7 is then fed by the latter in a direction away from the center, *i. e.* opposite to that which is taken by the first scroll. To enable the material to pass from the first central chamber to the second or adjacent one, the chamber 8 is of a truncated conoidal shape with the larger diameter next to the second chamber 9, the material thereby gravitating toward the second chamber from the first one and into the center of the second scroll.

A plurality of pairs of scrolls are provided side by side lengthwise, and in the interior of the drying cylinder. Conveniently there are five such pairs. To isolate each scroll and the chamber appurtenant thereto from its neighbor, division plates or disks 10 are provided which are perforated some at the center to allow the material to gravitate from the conoidal central chamber 8 to the cylindrical one 9 while the next division plate is perforated at or near the periphery only, the center portion constituting an isolating plate between adjacent pairs of chambers. The scrolls have a passage-way of sufficient size to satisfactorily accommodate the stones or other material during their passage toward or away from the central chambers.

The periphery of the drying cylinder may be perforated at 11 to allow the dust shaken from the stones in their passage through the drying cylinder to escape, and a chute may be incorporated to convey said dust away to any convenient place; the perforations may extend axially of the cylinder for a distance of two scrolls, next to the chamber adjacent to the mixing chamber.

The mixing chamber 12 is an enlargement of the drying cylinder and is suitably attached thereto, and as the last scroll traverses the material outward from the center, said material falls into the adjacent mixing chamber. The lower portion of the mixing chamber rotates in a tar tank or sump 13 with the result that the stones which have fallen to the bottom of the mixing chamber are immersed and satisfactorily impregnated with the tar which has entered through radial and facial perforations 14. A suitable scoop 15 of scroll, spiral or other form is provided in the mixing chamber to elevate and convey the material until it reaches a chamber 16 concentric with the mixing chamber, said concentric chamber being of conoidal shape similar to those described in connection with the drying cylinder. The stones gravitate still in the same direction into the draining chamber 17 which is adjacent to the mixing chamber and are thence discharged from the open end of the drainage chamber. Concentrically arranged to the draining chamber is a cylinder 18 adapted to form an annular chamber 19 wherein the tar draining from the stones is received and passes out through perforations into a tar draining chute 20 arranged at the lowest point of the annulus; said chute is inclined and communicates with the tar tank 13 with the consequent drainage of superfluous tar back to the tank.

A firebox 21 is arranged underneath the tar tank and drying cylinder and communicates with a flue 22 extending the remaining portion of the drying chamber, an annular flue 23 surrounding the outlet of the first-named flue 22 in such a way as to withdraw the combustion products in the manner of a down draft, the final exit 24 being at the top. A suitable number such as four of longitudinal belts 25 are arranged to clamp the division plates and scrolls together, said belts also constituting distance pieces between the division plates and the inside bore of the cylinder to allow moisture to pass out through the mouthpiece.

In operation, the material is delivered into the mouthpiece and thence into the outer portion of the first scroll; said scroll traverses the material to the chamber at the center of the cylinder, thence it gravitates along the bore of the conoidal chamber to the adjacent central cylinder by way of the perforations in the center of the division plate; from the central cylindrical chamber it is conveyed by the second scroll outwardly then passes through perforations near the periphery of the second division plate into the third scroll and so on throughout the entire series of scrolls until the mixing chamber is reached; a similar process takes place here until the material is discharged. Consequently it will be understood that the material is never reversed in direction but traverses the apparatus in one direction, until the material is thus discharged at the end opposite to that where it entered.

I claim—

1. An apparatus of the class described comprising in combination, a rotatable casing provided with mechanism for mixing and advancing the material in said casing, a receptacle adapted to contain a binding or impregnating liquid, said casing having a receiving portion for the advancing material provided with perforations and adapted to dip into said liquid, and a scroll like conveyer in said receiving portion for elevating and discharging the impregnated material, substantially as described.

2. An apparatus of the class described comprising in combination, a rotatable casing provided with mechanism for mixing and advancing material in said casing, a receptacle adapted to contain a binding or impregnating liquid, said casing having a receiving portion for the advancing material provided with perforations adapted to dip into said liquid, a scroll like conveyer in said receiving portion for elevating and discharging the impregnated material, and a drainage portion on said casing for receiving the discharge material, and draining the same from surplus liquid, substantially as described.

3. An apparatus of the class described comprising in combination, a rotatable casing provided with mechanism for mixing and advancing the material in said casing, a receptacle adapted for containing a binding or impregnating liquid, said casing having a receiving portion for the advancing material provided with perforations and adapted to dip into said liquid, and means in said receiving portion for elevating and discharging the impregnated material, substantially as described.

4. An apparatus of the class described comprising in combination, a receptacle adapted to contain a binding or impregnating liquid, a movable casing adapted to contain material to be impregnated and having a perforated portion dipping into the liquid in said receptacle, and means for elevating the impregnated material, substantially as described.

5. An apparatus of the class described comprising in combination, a receptacle adapted to contain a binding or impregnating liquid, a revoluble casing adapted to contain material adapted to be impregnated and having a perforated portion dipping into the liquid in said receptacle, and revolving means for elevating the impregnated material, substantially as described.

In witness whereof I have hereunto set my hand in the presence of two witnesses.

FREDERICK THOMPSON.

Witnesses:
ARTHUR H. BROWN,
HOLLIS F. BROWN.

Copies of this patent may be obtained for five cents each, by addressing the "Commissioner of Patents, Washington, D. C."